United States Patent Office 3,621,838
Patented Nov. 23, 1971

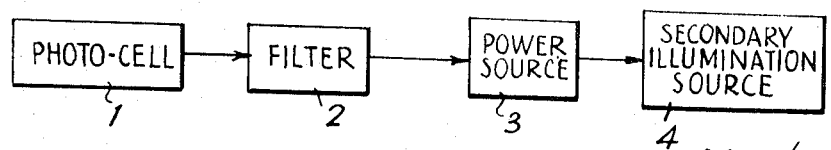
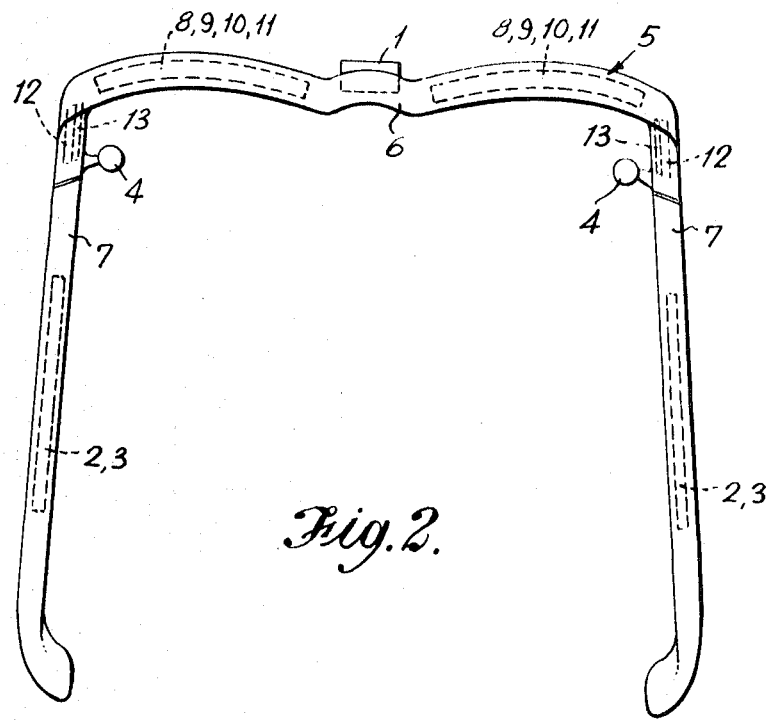
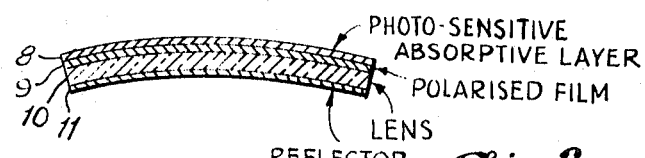
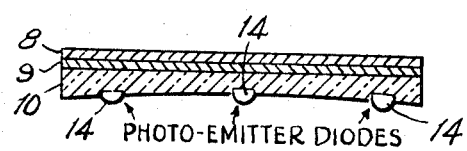

3,621,838
THERAPEUTIC SPECTACLES
Graham Frederick Anthony Harding, Shenstone, near Lichfield, and Neville Drasdo, Curdworth, England, assignors to National Research Development Corporation, London, England
Filed Mar. 26, 1970, Ser. No. 22,821
Claims priority, application Great Britain, Apr. 2, 1969, 17,243/69
Int. Cl. A61n
U.S. Cl. 128—82.1                10 Claims

ABSTRACT OF THE DISCLOSURE

A therapeutic device for alleviating photosensitive epilepsy comprises a pair of spectacles or the like in combination with means for detecting flickering illuminations in the adjacent environment at a predetermined frequency to which the intended wearer is sensitive, and a secondary source of steady illumination arranged for energisation in response to detection of said flickering illuminations.

---

This invention concerns therapeutic devices and more particularly spectacles or like devices for alleviating photosensitive epilepsy.

Various conditioning techniques have been proposed for alleviating photosensitive epilepsy, and one of interest relative to the present invention is the last of three discussed in a paper entitled "Stroboscopic Induced Seizure Discharges" by F. M. Foster et al., Arch. Neurol. (Chic.) 1964, 11, 603–608. Briefly, this technique involved placing two photoflood bulbs on either side of a stroboscope facing the patient. An opalescent screen was interposed between these three illumination sources and the patient. The method of conditioning involved raising the illumination intensity of the photofloods until stroboscopic stimulation produced no clinical or E.E.G. abnormality. After repeated stimulation trials, the illumination of the photofloods was progressively reduced, concomitant with an absence of E.E.G. and clinical abnormalities.

The researches leading to the present invention have not demonstrated any change in photosensitivity following use of the above technique, but it has been confirmed that reduced photosensitivity occurs when the flickering source is presented with adjacent other light stimuli. It has therefore been concluded that a technique directly providing a reduced contrast of the flickering illumination, to which the patient is sensitive, whenever it occurs in the environment of the patient will produce a beneficial therapeutic effect.

To this end, the present invention provides a therapeutic device comprising a pair of spectacles or the like in combination with means for detecting flickering illumination in the adjacent environment at a predetermined frequency to which the intended wearer is sensitive, and a secondary source of steady illumination arranged for energisation in response to detection of said flickering illumination.

For a fuller understanding of the invention, the same will now be described with reference to the accompanying drawings in which:

FIG. 1 schematically illustrates a system according to the invention for incorporation in spectacles;

FIG. 2 diagrammatically illustrates a pair of spectacles incorporating one form of system as discussed with reference to FIG. 1;

FIG. 3 similarly illustrates part of FIG. 2 in more detail, and

FIG. 4 illustrates part of a modified system compared to that of FIGS. 2 and 3.

FIG. 1 shows a photocell 1 responsive to illumination in the adjacent environment and from which the resultant output signal is applied to a filter 2. The filter will be arranged to respond to those frequencies of flicker to which the intended wearer is sensitive and will then actuate a power source 3 for a source of secondary illumination 4 to reduce the apparent contrast between the flickering source and other parts of the visual field of the wearer.

Clearly, such a system must be mobile to be carried by the patient, and is preferably carried in the region of the patient's eyes to reduce the requirements as to size, illumination and power for the secondary source. This leads to a desire that the system be applied with reasonable regard to cosmetic or other appearance. Given such requirements, spectacles make a good vehicle for the proposed system in the same way that they do for hearing aids, for example.

In a more particular realisation of the invention when incorporated in spectacles, the system is designed to present to each eye a light stimulus covering a visual angle of about 20° dependent upon pupil size. The stimulus of the secondary source therefore involves an area which subserves most of the information channels of the eye and is locked on to this area independently of eye movements.

A stabilized image can be provided for this purpose by the use of an ellipsoidal reflecting surface having one of its foci at the centre of rotation of the eye and the other at the position of the light source, which is located near the outer canthus. While not so ideal, a spherical surface approximation to that just discussed can be acceptable and is more practicable in manufacture. In either case an aluminised reflecting surface can be used to provide a reflecting factor of about 12.5%, the reflector being positioned between the spectacle lens and the eye.

Alternatively, the secondary source can be provided by solid-state light-emitting diodes incorporated in the spectacle lenses, in which case reflecting surfaces are not required. In practice it will probably be necessary to incorporate more than one such diode in each lens, the diodes having their emitting surfaces directed towards the centre of rotation of the eye.

FIG. 2 of the drawings shows, in plan view, a pair of spectacles according to the invention and FIG. 3 a section through a lens of such spectacles, both of these figures being diagrammatic. The spectacles comprise a lens-carrying frame 5 of conventional shaping with a photocell 1 mounted in the bridge piece 6 of such frame. Side arms 7, also of conventional shaping, are hingeably connected one from each end of the frame 5. A filter 2 and power source 3 are housed in one or both of the arms 7, and two secondary source bulbs 4 are mounted one on each end of the front frame portion, these ends being wrapped round as discussed hereinafter.

The lens of FIG. 3 consists of three components. The first is a photosensitive absorptive layer 8 which functions to reduce the range of brightness which is encountered and to help compensate for the variations in the relationships of the secondary stimulating light and the luminance of any hazardous flicker. The basis for including lens 8 is that a higher attenuation is beneficial on sunny days, whereas lower attenuation is appropriate to indoor situations, such as when viewing television.

The second lens component is a thin polarising film 9 designed to exclude the contribution of specular reflections which arise from horizontal surfaces and which are sources of high luminance pulses, as, for example, in rippling water reflecting sunlight.

The third lens component 10 will be for any optical correction that is required, incorporating prismatic and dioptic power to correct the patient's refractive error and any residual aberrations induced by oblique viewing through the associated reflector 11.

The use of a spectacle frame design which completely blocks the temporal peripheral visual field is desirable to afford protection from stimulation in this direction, but can be regarded as a safety hazard. As a compromise, it is proposed that thin photosensitive absorptive panels 12 be used in this area to attenuate high brightness, such a panel being combined with an aluminised or equivalent inner surface 13 to equate its transmission with that of the frontal lens system and to reflect the light source approximately towards the pupil. An aluminised film may also slightly enhance the speed of response of the photosensitive absorptive side panels.

The construction of the front or lens-carrying frame in any case preferably involves a rigid wrap-round portion at each end to avoid loss of rigidity in locating the components of the projection system. However, the side arms can still be hingeably connected to the frame, although the hinge axes will be set back from the frame so that the spectacles are somewhat bulkier when folded than conventional spectacles.

As mentioned earlier, a system such as that of FIGS. 2 and 3 can be modified to an alternative form employing solid-state light-emitting diodes in the spectacle lenses. This is indicated by the lens of FIG. 4 having components 8, 9 and 10 similar to those of FIG. 3, but no reflector 11. Three diodes are denoted at 14, and they may be embodied in lenticular capsules to concentrate the emission of light in a desired manner. When a pair of such lenses are incorporated in frames such as in FIG. 3, the light sources 4 are, of course, omitted. Also, it is to be noted that the lens component 10 does not need to correct for any residual abberations from the now absent reflectors 11, but merely for any inherent disorders in the patient's sight. The reflective surfaces 13 in the side panels will, however, still be normally desirable.

Lastly, while the more particular description above refers to location of the power source in the spectacle framework, this source could be separately portable by the patient as is sometimes the case with hearing aids. Indeed, this point is equally true for the filter. Any such separated component would, of course, be linked by a flexible connector to the spectacle-carried components. Naturally it will normally be more convenient for the patient if the system is self-contained within the spectacles.

We claim:

1. A therapeutic device comprising a pair of spectacles in combination with means for detecting flickering illuminations in the adjacent environment at a predetermined frequency to which the intended wearer is sensitive, and a secondary source of steady illumination arranged for energisation in response to detection of said flickering illuminations.

2. A device according to claim 1 wherein said detecting means comprises a photocell mounted on the framework of the spectacles, and a filter responsive to signals from said photocell at said predetermined frequency to connect said secondary source with an energisation power source therefor, the said secondary source also being mounted on said framework.

3. A device according to claim 2 wherein said spectacles are provided with a frontal lens assembly comprising a photosensitive absorptive layer, a polarising layer orientated to substantially exclude specular reflection from horizontal surfaces, and a lens component to effect any optical correction required by the user of the device.

4. A device according to claim 3 wherein said secondary source comprises a component located for positioning adjacent the outer canthus of an eye of the user when wearing the device, and said lens assembly comprises a concave reflector to reflect light from said secondary source component towards said eye.

5. A device according to claim 4 wherein said reflector has substantially ellipsoidal shaping with its foci respectively located substantially at said secondary source component and the centre of rotation of said eye.

6. A device according to claim 4 wherein said reflector is provided by an aluminised surface or equivalent to be transmissive to light incident from remote sources and reflective to light incident from said secondary source component in the manner of a "half mirror."

7. A device according to claim 3 wherein said secondary source comprises components in the form of solid-state light-emitting diodes carried in said lens assembly.

8. A device according to claim 7 wherein said diodes are embodied in lenticular capsules.

9. A device according to claim 3 wherein said spectacles comprise side panel components located in the temporal peripheral visual field of the user, each such panel comprising a photosensitive absorptive layer, and an aluminised or equivalent half-mirror form layer to equate the panel transmission with that of said frontal lens assembly.

10. A device according to claim 2 wherein said filter is also mounted on said framework.

References Cited
UNITED STATES PATENTS

| | | | |
|---|---|---|---|
| 3,277,888 | 10/1966 | Otwell | 128—76.5 |
| 3,492,989 | 2/1970 | Allen | 128—76.5 |

LAWRENCE W. TRAPP, Primary Examiner

U.S. Cl. X.R.

128—82.1, 380, 395; 351—158